United States Patent [19]

Boettcher

[11] 4,298,641
[45] Nov. 3, 1981

[54] HEAT RECOVERABLE ARTICLE

[75] Inventor: Bodo Boettcher, Ottobrunn, Fed. Rep. of Germany

[73] Assignee: N.V. Raychem S.A., Kessel-lo, Belgium

[21] Appl. No.: 929,170

[22] Filed: Jul. 28, 1978

Related U.S. Application Data

[62] Division of Ser. No. 680,478, Apr. 26, 1976, Pat. No. 4,118,260.

[30] Foreign Application Priority Data

Apr. 4, 1975 [GB] United Kingdom ............. 17362/75

[51] Int. Cl.³ .......................................... F16L 11/00
[52] U.S. Cl. .............................. 428/36; 174/DIG. 8; 428/913
[58] Field of Search ............ 174/72 C, DIG. 8, 75 R, 174/84 R, 88 R; 428/36, 913, 127, 128, 129; 264/230; 156/49, 54, 85, 86, 218, 215; 138/99, 156

[56] References Cited

U.S. PATENT DOCUMENTS

| | | | |
|---|---|---|---|
| 2,073,490 | 3/1937 | Feinn | 174/72 C |
| 2,855,027 | 10/1958 | Bank | 428/128 |
| 3,404,217 | 10/1968 | Kelly | 156/54 |
| 3,416,991 | 12/1968 | Yoshimura | 428/127 |
| 3,455,336 | 7/1969 | Ellis | 174/DIG. 8 |
| 3,580,980 | 5/1971 | Gladh | 174/70 C |
| 3,694,563 | 9/1972 | Monds et al. | 174/72 C |
| 3,721,749 | 3/1973 | Clabburn | 174/DIG. 8 |
| 3,847,721 | 11/1974 | Evans | 174/DIG. 8 |
| 3,949,110 | 4/1976 | Nakajima et al. | 428/36 |
| 3,982,564 | 9/1976 | Clabburn et al. | 174/DIG. 8 |
| 4,085,286 | 4/1978 | Horsma et al. | 174/DIG. 8 |
| 4,086,427 | 4/1978 | Nasuta, Jr. et al. | 174/DIG. 8 |

FOREIGN PATENT DOCUMENTS 1506242  4/1978  United Kingdom ......... 174/DIG. 8

Primary Examiner—Stanley S. Silverman
Attorney, Agent, or Firm—Lyon & Lyon

[57] ABSTRACT

A heat-recoverable article such as a heat-shrinkable wrap-around sleeve is provided with at least one auxiliary conduit so as to facilitate its application to the installation and repair of break-out joints from main-line cables, especially power and telephone cables. The auxiliary conduit is formed by bonding together appropriate regions of the internal principal surface of the article, coupled if necessary with a cutting step. Bonding is preferably achieved by use of a cross-linking material such as a peroxide.

4 Claims, 7 Drawing Figures

HEAT RECOVERABLE ARTICLE

This is a division of application Ser. No. 680,478, filed Apr. 26, 1976 now U.S. Pat. No. 4,118,260.

BACKGROUND OF THE INVENTION

This invention relates to heat-recoverable articles, especially heat-shrinkable articles.

Heat-recoverable articles are well known and, in their most common form comprise a heat-shrinkable sleeve which is made from a polymeric material capable of having the property of plastic or elastic memory imparted to it. This sleeve is expanded at an elevated temperature to a diameter greater than its normal diameter and is then cooled while being maintained in the enlarged dimension. A sleeve treated in this manner will retain its expanded dimensions until it is again heated, at which time it will recover towards its original shape. Examples of heat-recoverable sleeves may be found in U.S. Pat. No. 2,027,962 (Curries) and U.S. Pat. No. 3,086,242 (Cook et al), the disclosures of which are incorporated herein by reference.

Such sleeves find many applications especially in the connection and termination of wires, cables and pipes. However, there are many instances where it is desirable to provide a sealing, insulating or protective closure member for elongated objects, for example, cables and pipes, where the ends of the elongated objects are not accessible, or if accessible, where it is undesirable to disconnect or otherwise displace them from their original position. For such applications so-called "wrap-around sleeves" have been developed. Basically, these are heat-recoverable sheets of material which can be wrapped around the substrate to form a generally tubular shape and which are generally provided with means for holding them in the wrapped-up configuration during recovery, although in some cases this may be achieved on site, for example by the use of suitable adhesives. Various types of heat-recoverable wrap-around sleeves are described, for example, in U.S. Pat. No. 3,379,218 and British Pat. Nos. 1,155,470, 1,211,988 and 1,346,479 the disclosures of all of said Patents being incorporated herein by reference.

Such heat-recoverable wrap-around sleeves have proved extremely successful in many applications. However, one further problem which has been encountered in the insulation and sealing of extended elongated substrates has been the effective sealing of members which branch out from the main substrate; one particular instance of this is where a power cable branch joins a main power cable. In such situations the use of a simple wrap-around sleeve is not possible and, whilst attempts have been made with varying degrees of success to use such heat-recoverable wrap-around sleeves in conjunction with other means such as mastic coatings, no satisfactory simple solution has to date been found. The problem is especially acute with pressurised cable.

It is an object of this invention to provide a novel heat-recoverable article which can be manufactured in a simple manner yet which can successfully be used in the installation and repair of break-out joints from main line cables and overcome the problems set forth above.

SUMMARY OF THE INVENTION

The present invention provides a method for the manufacture of a heat-recoverable article, especially a heat-recoverable wrap-around article, provided with at least one auxiliary conduit which comprises bonding together at least two areas of one of the principal surfaces of the heat-recoverable article to form said conduit.

The present invention also provides a heat-recoverable article provided with at least one auxiliary conduit which has been formed by bonding together at least two areas of one of its principal surfaces.

DESCRIPTION OF PREFERRED EMBODIMENTS

The present invention may in some applications advantageously be applied to preformed heat-recoverable sleeves, e.g. heat-shrinkable tubes, in order to form one or more auxiliary conduits therein but, in general, is applied to heat-recoverable wrap-around articles, especially sleeves, in order to overcome the problem discussed above. Accordingly, the invention will, for convenience, from hereon be described with reference to wrap-around sleeves.

The size and position of the areas bonded together will, of course, depend on the nature of the auxiliary conduit required. However, in most simple applications a satisfactory branch conduit can be formed at one end of a wrap-around sleeve by bonding together two narrow-spaced-apart longitudinal strips at that end of the sleeve, the spacing of the strips and their length being chosen according to the end circumference and length, respectively, of the branch conduit required.

In such an embodiment it will not be necessary to perform any other operation on the sleeve. However, in other more complex situations, additional steps carried out before or after the bonding step, such as cutting, may be employed. For example a branch conduit along the length of the sleeve may be made by bonding together two areas spaced apart along the length of the sleeve and then cutting a hole in the sleeve between the two bonded portions.

It will be appreciated that the areas bonded together will be on the internal surface of the sleeve.

It is, of course, possible to form more than one branch conduit in the sleeve and it is also within the scope of the present invention to form an auxiliary conduit which does not communicate with the main sleeve conduit. For example a sleeve could be formed as a double conduit by bonding together two narrow strips extending throughout its length.

The bonding must be sufficiently strong that it is not significantly damaged upon recovery and that it fulfils any other requirement of the particular application. In this respect the present invention contemplates the use of many conventional methods of bonding including the use of adhesives including thermosetting polyimides, ethylene/vinyl acetate copolymers silicone resins and epoxy resins such as flexible epoxy polyamides.

However, the method of bonding especially preferred for use in the present invention uses peroxides and other similar cross-linking agents. Such materials can be used on their own if they exist in liquid form or if they exist in solid form may be used in solution in, for example, xylene or in dispersion in, for example, an adhesive material such as an ethylene/vinyl acetate copolymer.

Amongst suitable liquid agents there may be mentioned, for example t-butyl peroctoate and t-butyl perbenzoate. Amongst suitable solids, those available commercially are Varox (2,5-bis-tert-butyl peroxy-2,5-dimethyl hexane), Luperco 130XL (2,5-di-tert.-butyl peroxy-2,5-dimethyl-hexyne-3) and Dicup (dicumyl peroxide). Other suitable agents include peroxysilanes and the cross-linking agents listed in British Pat. Nos. 1,131,010, 1,242,911 and 1,258,982, the disclosures of which are incorporated herein by reference.

These materials can be readily applied to the surfaces to be bonded, for example by painting them on with a brush or by coating during manufacture of the sleeve. Bonding can then be readily effected using conventional apparatus for the application of the necessary heat and pressure. Typically bonding will be effected using a temperature in the range of from 200 to 350° C. and a pressure of from 5 to 20 Kg/cm², the heating cycle being from about 30 seconds to 1 minute or higher, depending on the thickness of the material, and the pressure being maintained for up to about 5 minutes as the bond cools or is cooled.

Many materials may be used to make the heat-recoverable wrap-around sleeves of the present invention. Suitable materials are described for example in the afore-mentioned U.S. and British Patents. It will also be appreciated that the sleeves may be provided with other means for improving their sealing ability etc. for example they may be internally coated with an adhesive or a mastic. Such materials will, if present, in general be applied after bonding has been effected in accordance with the present invention, but may, if desired, be applied before bonding.

As mentioned above, the present invention is especially applicable to the repair and formation of splices and breakouts from pressurised power cables. Another application is in the connection and repair etc. of telephone cables. In such applications it is often preferable to provide the wrap-around sleeve with an inner lining of metal foil as so to form a moisture barrier. In order that the metal foil should not prevent or hinder recovery of the sleeve it may be corrugated, at least in the vicinity of the ends of the sleeve, as set forth in French Patent Application No. 74.30569. Such heat-recoverable sleeves can also be used in the present invention, a suitable adhesive being applied to the relevant areas of the metal foil, thereby forming a moisture impermeable joint.

DETAILED DESCRIPTION OF THE DRAWINGS

Figure 1:
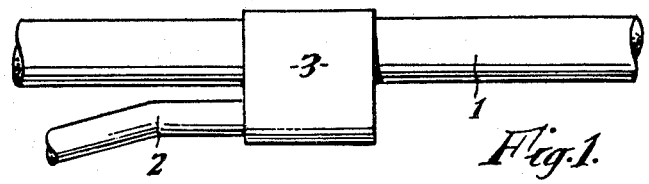
FIG. 1 represents a branch connection between two cables.

Referring to the drawings, in FIG. 1 there is shown a typical branch connection between a main power cable 1 and a branch cable 2, the cables being connected after stripping etc. by a connector member 3. It is an object of the present invention to provide means for satisfactorily insulating and encapsulating such a branch connection.

Figure 2:
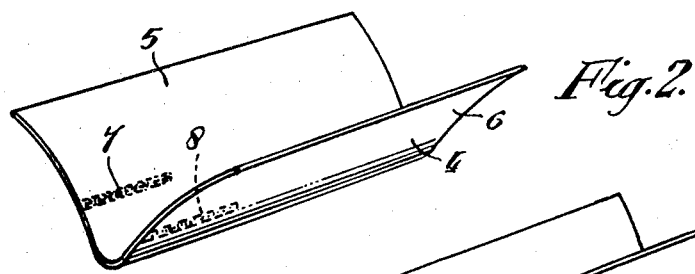
FIG. 2 illustrates a wrap-around sleeve for use in the present invention.

In FIG. 2 there is shown a heat-recoverable wrap-around sleeve 4. At or about one or both its edges 5 and 6 there are provided means (not shown) for holding it in the wrapped-up position during recovery. The internal surface of the sleeve 4 is provided at 7 and 8 with two narrow strips of a peroxide coating, typically about 10 mm wide. The coatings 7 and 8 may also contain one or more adhesives, for example an ethylene/vinyl acetate adhesive.

Figure 3:
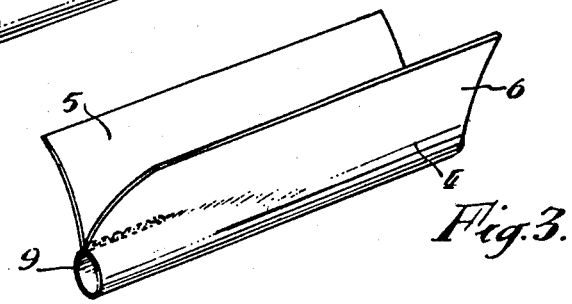
FIG. 3 illustrates the sleeve of FIG. 2 after it has been bonded in accordance with the present invention.

In FIG. 3 there is shown the wrap-around sleeve of FIG. 2 after the two strips 7 and 8 have been bonded together in the manner described above to form an auxiliary conduit 9.

Figure 4:
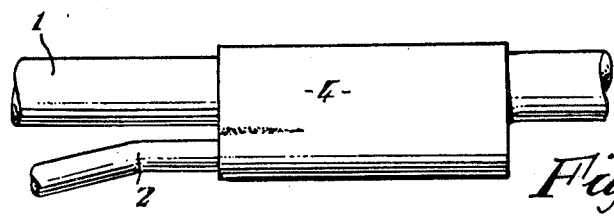
FIG. 4 illustrates the wrap-around sleeve of FIG. 3 in position about the branch connection shown in FIG. 1.

FIG. 4 illustrates the sleeve of FIG. 3 wrapped in position, prior to recovery, about the branch connection shown in FIG. 1. The positioning of the sleeve has been effected by passing the branch cable 2 through the auxiliary conduit 9 prior to forming the connection and then wrapping the sleeve 4 about the connection in a conventional manner.

Figure 5:
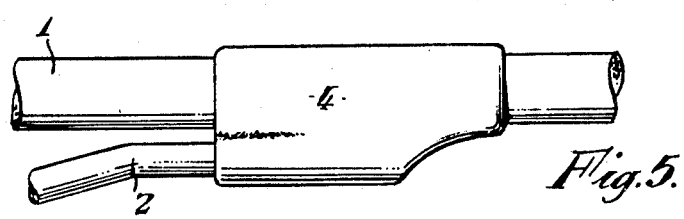
FIG. 5 illustrates the embodiment of FIG. 4 after heat-recovery of the wrap-around sleeve.

FIG. 5 shows the position after heat-recovery of the wrap-around sleeve to give the final encapsulated connection.

Figure 6:
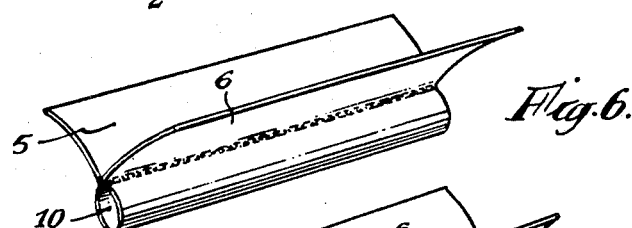
FIG. 6 illustrates a second form of wrap-around sleeve according to the present invention.

In FIG. 6 there is shown a further form of wrap-around sleeve according to the present invention in which an auxiliary conduit 10 has been formed throughout the length of the sleeve.

Figure 7:
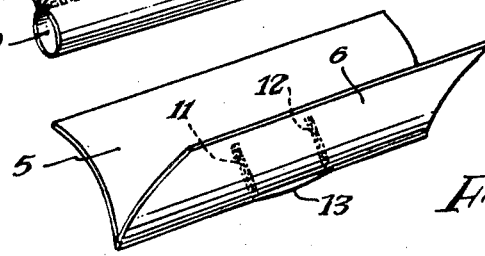
FIG. 7 illustrates a third form of wrap-around sleeve according to the present invention.

FIG. 7 shows another form of wrap-around sleeve according to the present invention in which two bonds 11 and 12 have been formed across the length of the sleeve and then the sleeve has been cut or slit between these bonds to form a branch conduit 13.

The invention has been described with particular reference to the repair and formation of branch connections between cables but it will be appreciated that it will have many other applications.

I claim:

1. A heat recoverable article which comprises a heat recoverable sleeve that has been provided with at least two conduits, being respectively an auxiliary conduit being formed by bonding together at least two strips of bonding material on at least a portion of the surface of said sheet which in use forms the interior of said heat recoverable sleeve, and a main conduit formed by a holding means fastening together opposed edges of said sheet, said conduits being capable of receiving a substrate.

2. A heat-recoverable article as claimed in claim 1, which is a wrap-around article.

3. A heat-recoverable article as claimed in claim 1, wherein the auxiliary conduit is positioned at one end thereof.

4. A heat-recoverable article as claimed in claim 1, wherein the auxiliary conduit is formed throughout its length.

* * * * *